(12) United States Patent
Martin et al.

(10) Patent No.: US 7,211,634 B1
(45) Date of Patent: May 1, 2007

(54) PROCESS FOR THE PREPARATION OF POLYESTERS CONTAINING 1,4-CYCLOHEXANEDIMETHANOL

(75) Inventors: Daniel Lee Martin, Kingsport, TN (US); Joseph Franklin Knight, Kingsport, TN (US); Benjamin Fredrick Barton, Kingsport, TN (US); Damon Bryan Shackelford, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/414,466

(22) Filed: Apr. 28, 2006

(51) Int. Cl.
*C08F 2/00* (2006.01)
*C08G 63/00* (2006.01)

(52) U.S. Cl. .................. 526/66; 528/176; 528/194; 528/298; 528/300; 528/301; 528/302; 528/306; 528/307; 528/308; 528/308.5

(58) Field of Classification Search ............... 528/176, 528/194, 298, 300, 301, 302, 306, 307, 308, 528/308.6; 526/66
See application file for complete search history.

(56) References Cited

U.S. PATENT DOCUMENTS

| | | | |
|---|---|---|---|
| 2,901,466 A | 8/1959 | Kibler et al. | |
| 3,070,575 A | 12/1962 | Cramer | |
| 3,271,370 A | 9/1966 | Akin et al. | |
| 3,487,049 A | 12/1969 | Busot | |
| 3,551,386 A | 12/1970 | Berkau et al. | |
| 3,709,859 A | 1/1973 | Hrach et al. | |
| 3,787,370 A | 1/1974 | Shima et al. | |
| 3,984,379 A | 10/1976 | Oka et al. | |
| 4,020,049 A | 4/1977 | Rinehart | |
| 4,205,157 A | 5/1980 | Duh | |
| 4,238,593 A | 12/1980 | Duh | |
| 4,442,269 A | 4/1984 | Sommerfeld et al. | |
| 4,983,711 A | 1/1991 | Sublett et al. | |
| 5,034,263 A * | 7/1991 | Maier et al. ............ | 428/215 |
| 5,039,717 A | 8/1991 | Kawakami et al. | |
| 5,194,573 A | 3/1993 | Schmidt et al. | |
| 5,198,530 A | 3/1993 | Kyber et al. | |
| 5,340,907 A | 8/1994 | Yau et al. | |
| 5,385,773 A | 1/1995 | Yau et al. | |
| 5,608,031 A * | 3/1997 | Yau et al. ............... | 528/281 |
| 5,616,404 A * | 4/1997 | Sublett ................... | 428/221 |
| 5,631,330 A | 5/1997 | Yezrielev et al. | |
| 5,650,481 A * | 7/1997 | Yau et al. ............... | 528/280 |
| 5,656,715 A * | 8/1997 | Dickerson et al. ...... | 528/271 |
| 5,681,918 A | 10/1997 | Adams et al. | |
| 5,986,040 A | 11/1999 | Patel et al. | |
| 6,084,055 A | 7/2000 | Brunelle et al. | |
| 6,103,859 A | 8/2000 | Jernigan et al. | |
| 6,143,837 A | 11/2000 | Al Ghatta et al. | |
| 6,197,856 B1 * | 3/2001 | Dean et al. ............. | 524/141 |
| 6,239,200 B1 | 5/2001 | Kau et al. | |
| 6,342,579 B2 * | 1/2002 | Jeon et al. .............. | 528/279 |
| 6,350,851 B1 | 2/2002 | Inada et al. | |
| 6,399,716 B2 | 6/2002 | Chung et al. | |
| 6,429,278 B1 | 8/2002 | Howell, Jr. et al. | |
| 6,455,664 B1 | 9/2002 | Patel et al. | |
| 6,458,915 B1 | 10/2002 | Quillen | |
| 6,646,086 B2 | 11/2003 | Slone | |
| 6,740,377 B2 * | 5/2004 | Pecorini et al. ......... | 428/35.7 |
| 6,828,410 B2 | 12/2004 | Brunelle et al. | |
| 6,924,349 B2 * | 8/2005 | Lee et al. ............... | 528/272 |

FOREIGN PATENT DOCUMENTS

| | | |
|---|---|---|
| EP | 1 386 937 A1 | 2/2004 |
| JP | 49-117378 | 4/1976 |
| JP | 2000-178348 | 6/2000 |
| JP | 2000-178349 | 6/2000 |

OTHER PUBLICATIONS

Derwent Abstract JP 51044199, Toyo Spinning Co. Ltd.
Duh, *Journal of Applied Polymer Science*, vol. 89, 2003, pp. 3188-3200.
Duh, *Journal of Applied Polymer Science*, vol. 83, 2002, pp. 1288-1304.
Duh, *journal of Applied Polymer Science*, vol. 81, 2001, pp. 1748-1761.
Collins et al, *Macromolecules*, vol. 33, 2000, pp. 2974-2980.
Paatero et al, *Chemical Engineering Science*, vol. 49, 1994, pp. 3601-3616.
Van Sickle and Garrity, *Polymer Engineering and Science*, vol. 70, 1993, pp. 163-164.
Siclovan, *Chemical Bulletin of Polytechnic Institute Taian Vuia of Timisoara*, vol. 35, 1990, pp. 127-140.
Chen and Chen, *J. Poly. Sci. Part A: poly. Chem.*, vol. 25, 1987, pp. 533-549.
Gregory and Watson, *Polymer Engineering and Science*, vol. 12, 1972, pp. 454-458.

* cited by examiner

*Primary Examiner*—James J. Seidleck
*Assistant Examiner*—Gennadiy Mesh
(74) *Attorney, Agent, or Firm*—Louis N. Moreno; Bernard J. Graves, Jr.; Eric D. Middlemas

(57) ABSTRACT

Disclosed is a process for the preparation of high molecular weight polyesters by reacting one or more dicarboxylic acids directly with 1,4-cyclohexanedimethanol and, optionally, one or more diols. The process uses an overall diol to dicarboxylic acid molar ratio of about 0.97 to about 1.2 and an incremental addition of either the diacid or diol components. The process provides a shorter total reaction time and, thus, lessens the thermal degradation of polyester which may result in high color and reduced molecular weight.

36 Claims, No Drawings

PROCESS FOR THE PREPARATION OF POLYESTERS CONTAINING 1,4-CYCLOHEXANEDIMETHANOL

FIELD OF THE INVENTION

This invention pertains to a process for the preparation of thermoplastic polyesters. More particularly, this invention pertains to a polyester process in which one or more dicarboxylic acids is reacted directly with a diol component comprising 1,4-cyclohexanedimethanol and, optionally, one or more diols, in a low overall diol:dicarboxylic acid ratio.

BACKGROUND OF THE INVENTION

Polyesters containing 1,4-cyclohexanedimethanol (abbreviated hereinafter as "CHDM") as a diol component are often produced using a dialkyl esters such as, for example, dimethylterephthalate (DMT), dimethylisophthalate, and 1,4-dimethylcyclohexane dicarboxylate, as the source of the diacid component. In a typical process, for example, a dialkyl ester is reacted with one or more diols in a transesterification reaction to produce an oligomer. The alkyl alcohol by-product is removed from the reaction medium, usually by distillation, to help to push the reaction equilibrium toward oligomer formation. The transesterification step is conducted at high temperatures, typically from about 200° C. to about 270° C., and at pressures between about 101 to 515 kPa (0 to 60 psig). The transesterification step is followed by a polymerization step where excess diol is removed and the oligomer converted further in a polycondensation reaction to yield a high molecular weight polyester. This method requires high diol:ester mole ratios (typically in the range of 1.5 to 6.0) to obtain high conversion of the alkyl ester groups in the transesterification step. High diol:ester ratios, however, require removal of excess diol in order to produce a polyester of sufficiently high molecular weight for film, sheet, and molded plastic applications. Removal of excess diol, however, is difficult when high-boiling diols are used, that is diols having a boiling point greater than about 230° C. such as, for example, CHDM. With high-boiling diols, it is frequently necessary to conduct the polycondensation step at high temperatures of about 270° C. to 310° C. and at pressures of about 53 kPa to about 0.013 kPa for extended periods of time in order to remove sufficient diol to produce a high molecular weight polyester.

Although diester-based polyester processes have been practiced commercially for many years, dicarboxylic acids are preferred as starting materials because water is generated as a by-product instead of an alcohol. Water is easy to remove and is non-hazardous. In addition, reacting a dicarboxylic acid directly with a diol eliminates the additional processing steps associated with the esterification of diacids to the corresponding dialkyl esters. Unfortunately, using dicarboxylic acids as a starting material instead of a dialkyl esters in polyester process presents a number of problems, especially when CHDM and other high boiling diols are used as a diol component. For example, many dicarboxylic acids have low solubility in diols which greatly reduces the rate of the esterification reaction. In particular, TPA has an low solubility in CHDM. To help overcome this low solubility, excess diol is often added to the esterifcation step to help drive conversion of the diol and the dicarboxylic acid to the oligomer. Any excess diol, however, must be removed during the polymerization step, often requiring extended process times at elevated temperatures and low pressures (typically less than 0.7 kPa). In addition, long reaction times during the polymerization step are often required to build sufficient molecular weight. Lengthy process times and elevated temperatures, however, frequently can lead to the development of color and the thermal degradation of the polyester. In polyester compositions that are substantially amorphous, this degradation can lead to a loss of clarity or to the formation of high color in the polyester product. For polyesters that exhibit a sufficient degree of crystallinity, the polycondensation reaction can be terminated at some intermediate step and the polyester then subjected to solid-state polymerization to increase molecular weight. Solid state polymerization, however, is expensive and requires additional equipment. These problems have created a need for a polyester process that avoids long reaction times and thermal degradation problems when dicarboxylic acids are used as starting materials in combination with CHDM.

SUMMARY OF THE INVENTION

We have discovered that polyesters based on 1,4-cyclohexane-dimethanol, abbreviated herein as "CHDM", may be produced efficiently by the reaction of one or more dicarboxlic acids directly with CHDM and, optionally, one or more diols in low diol:dicarboxylic acid molar ratios. Thus, the present invention provides process for the preparation of a polyester, comprising: adding a diol component comprising 1,4-cyclohexanedimethanol, and a diacid component to a reaction zone at a total diol:diacid component molar ratio of about 0.97 to about 1.2 to produce a substantially linear, thermoplastic polyester having an inherent viscosity of at least 0.5 dL/g, wherein the diacid component is added incrementally to the reaction zone and the diol:diacid component molar ratio in the reaction zone is greater than the total ratio until the addition of the diacid component is completed. Our novel process uses a low total diol:diacid molar ratio of about 0.97 to about 1.2 and an incremental addition of the dicarboxylic acid component to a reaction zone in which the molar ratio of diol:diacid components added to the reaction zone is greater than the total molar ratio mixture until the addition of the carboxylic acid is completed. Further, it has been found unexpectedly that maintaining the reaction zone during the esterification phase of the process at a temperature of 250° C. or less, such as, for example, at a temperature of about 210 to about 250° C., produces an oligomer which exhibits higher polymerization rates than an oligomer produced at higher esterification temperatures. A higher polymerization rate provides a shorter reaction time to obtain a polyester of high molecular weight. The polyesters from the process of the invention have excellent clarity and may be used in packaging applications, textiles, sheeting, and film.

Although the process of the invention may be used to prepare any polyester, it is particularly useful for polyesters containing the residues of high boiling diols, such as CHDM, where removal of excess diol is difficult because of the high temperatures required to distill the diol from the reaction mixture. The term "high-boiling diol", as used herein, means a diol that exhibits a boiling point above 230° C. at atmospheric pressure (approximately 101 kPa). Thus, our process can be used advantageously for the preparation of a variety of polyesters and copolyesters containing 1,4-cyclohexanedimethanol. For example, the diacid component may comprise at least 80 mole percent, based on the total moles of diacid component, of one or more dicarboxylic acids selected from the group consisting of terephthalic acid, naphthalenedicarboxylic acid, 1,4-cyclohexane-dicarboxylic acid, and isophthalic acid. The diol component may comprise about 10 to 100 mole percent, based on the total moles of the diol component, 1,4-cyclohexanedimethanol. In addition to CHDM, the diol component may comprise from 0 to about 90 mole percent of one or more diols selected from neopentyl glycol, diethylene glycol, ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 1,3-cyclohexanedimethanol, bisphenol A, and polyalkylene glycol. The polyesters prepared by the process of the instant invention are thermoplastic polyesters having an inherent viscosity (abbreviated herein as "IV") of at least 0.5 dL/g. Other examples of IV's that may be exhibited by the polyester are at least 0.6 dL/g, at least 0.65 dL/g, and at least 0.7 dL/g.

Alternatively, our process may be carried out by adding the diol component incrementally to the reaction zone. Thus, another embodiment of the present invention is a process for the preparation of a polyester, comprising: adding at least one diol and at least one dicarboxylic acid to a reaction zone under polymerization conditions at a total diol:dicarboxylic acid molar ratio of about 0.97 to about 1.2 to produce a substantially linear, thermoplastic polyester having an inherent viscosity of at least 0.5 dL/g, wherein the diol is added incrementally to the reaction zone at a reaction zone temperature of about 210 to about 250° C. and the molar ratio of diol:dicarboxylic acid added to the reaction zone is less than the total molar ratio until the addition of the diol is completed. This embodiment of the invention may be used, for example, when the physical properties of the diacid or diol component are such that it is preferable for ease of operation to add the diol incrementally to the reaction zone.

The process of our invention may be carried out as a batch, semicontinuous, or continuous process and may employ 2 or more reactors. Without being bound by theory, it is believed that during the addition of the diacid component, the primary reaction mechanism for increasing molecular weight in the polymerization stage is esterification rather than polycondensation. The water produced from the esterification reaction, from a mass transfer consideration, is easier to remove than excess diol. In addition, because the reaction kinetics for esterification are, in general, faster than the reaction kinetics for transesterification of the associated alkyl ester, the overall rate of the polymerization process is increased.

DETAILED DESCRIPTION

The present invention provides a process for the preparation of high molecular weight thermoplastic polyesters containing 1,4-cyclohexane-dimethanol. In a general embodiment, our invention provides a process for the preparation of a polyester, comprising: adding a diol component comprising 1,4-cyclohexanedimethanol, and a diacid component to a reaction zone at a total diol:diacid component molar ratio of about 0.97 to about 1.2 to produce a substantially linear, thermoplastic polyester having an inherent viscosity of at least 0.5 dL/g, wherein the diacid component is added incrementally to the reaction zone and the diol: diacid component molar ratio in the reaction zone is greater than the total molar ratio until the addition of the diacid component is completed. Our process provides an increased rate of reaction in comparison to traditional methods where higher diol ratios and higher temperatures are used and is useful for polyesters containing CHDM and other high-boiling diols where removal of excess diol from the reaction milieu is difficult.

Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "C1 to C5 hydrocarbons", is intended to specifically include and disclose C1 and C5 hydrocarbons as well as C2, C3, and C4 hydrocarbons. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, reference a "polyester," or a "dicarboxylic acid," is intended to include the processing or making of a plurality of polymers, or dicarboxylic acids. For example, references to a composition containing or including "an" ingredient or "a" polyester is intended to include other ingredients or other polyesters, respectively, in addition to the one named. By "comprising" or "containing" or "including" we mean that at least the named compound, element, particle, or method step, etc., is present in the composition or article or method, but do not exclude the presence of other compounds, catalysts, materials, particles, method steps, etc, even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The process of the present invention is for the preparation of thermoplastic polyesters comprising dicarboxylic acid monomer residues, diol monomer residues, and repeating units. Thus, the term "monomer residue", as used herein, means a residue of a dicarboxylic acid, a diol, or a hydroxycarboxylic acid. A "repeating unit", as used herein, means an organic structure having 2 monomer residues bonded through a carbonyloxy group. The polyesters of the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % of a monomer, which may be a dicarboxylic acid, a diol, or hydroxycarboxylic acid, based on the total repeating units, means that the polyester contains 30 mole % monomer out of a total of 100 mole % repeating units. Thus, there are 30 moles of monomer residues among every 100 moles of repeating units. Similarly, a polyester containing 30 mole % of a dicarboxylic acid monomer, based on the total acid residues, means the polyester contains 30 mole % dicarboxylic acid monomer out of a total of 100 mole % acid residues. Thus, in this latter case, there are 30 moles of dicarboxylic acid monomer residues among every 100 moles of acid residues.

The term "polyester", as used herein, encompasses both "homo-polyesters" and "copolyesters" and means a synthetic polymer prepared by the polycondensation of a diacid component, comprising one or more difunctional carboxylic acids, with a diol component, comprising one or more, difunctional hydroxyl compounds. Typically the difunctional carboxylic acid is a dicarboxylic acid and the difunctional hydroxyl compound is a dihydric alcohol such as, for example glycols and diols. Alternatively, the difunctional carboxylic acid may be a hydroxy carboxylic acid such as, for example, p-hydroxybenzoic acid, and the difunctional hydroxyl compound may be a aromatic nucleus bearing 2 hydroxy substituents such as, for example, hydroquinone. The term "thermoplastic polyester", as used herein, is intended to have its plain meaning as would be understood by persons having ordinary skill in the art, that is, a polyester that softens when exposed to heat and returns to its original condition when cooled to room temperature. By the term "substantially linear", as used in the specification and the claims, it is meant that the polyester contains 2 mole percent or less, based on the total moles of diol or diacid residues, of the residues of a branching agent. The term "residue", as used herein, means any organic structure incorporated into the polymer through a polycondensation reaction involving the corresponding monomer. Although the dicarboxylic acid residue may be derived from a dicarboxylic acid monomer or its associated acid halides, esters, salts, anhydrides, or mixtures thereof, the diacid component of present invention is understood to comprise dicarboxylic acids instead of the corresponding derivatives of dicarboxylic acids such as, for example, the associated acid halides, esters, half-esters, salts, half-salts, anhydrides, mixed anhydrides, or mixtures thereof. For example, in one embodiment of the invention the diacid component consists essentially of one or more dicarboxylic acids. In another embodiment, the diacid component consists of one or more dicarboxylic acids.

The process of the instant invention comprises adding a diol component comprising 1,4-cyclohexanedimethanol, and a diacid component to a reaction zone at a total diol:diacid component molar ratio of about 0.97 to about 1.2. The diacid component, for example, may comprise at least 80 mole percent, based on the total moles of diacid component, of one or more dicarboxylic acids selected from terephthalic acid, naphthalenedicarboxylic acid, 1,4-cyclohexanedicarboxylic acid, and isophthalic acid. Any of the various isomers of naphthalenedicarboxylic acid or mixtures of isomers may be used, but the 1,4-, 1,5-, 2,6-, and 2,7-isomers are preferred. Also, 1,4-cyclohexanedicarboxylic acid may be present at the pure cis or trans isomer or as a mixture of cis and trans isomers. In addition to the dicarboxylic acids listed above, the diacid component may further comprise about 0 to 20 mole percent of one or more modifying dicarboxylic acids. Examples of modifying dicarboxylic acids include, but are not limited to, fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbene-dicarboxylic, and sulfoisophthalic acids.

The diol component may comprise about 10 to 100 mole percent, based on the total moles of the diol component, of 1,4-cyclohexanedimethanol (referred to as "CHDM" hereinafter). The CHDM may be used as a pure cis or trans isomer or as a mixture of cis and trans isomers. In addition to CHDM, the diol component may comprise from 0 to about 90 mole percent of one or more diols selected from neopentyl glycol, diethylene glycol, ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 1,3-cyclohexanedimethanol, bisphenol A, and polyalkylene glycol.

For example, the diacid component may comprise from about 60 to 100 mole percent terephthalic acid and 0 to about 40 mole percent isophthalic acid and the diol residue may comprise about 100 mole percent 1,4-cyclohexanedimethanol. In another example, the diacid component may comprise about 95 mole percent terephthalic acid and about 5 mole percent isophthalic acid. In yet another example, the diacid component may comprise 100 mole percent terephthalic acid. The diol component may comprise other diols in addition to CHDM. For example, the diacid component may comprise 80 to 100 mole percent terephthalic acid and the diol component may comprise about 50 to about 90 mole percent 1,4-cyclohexanedimethanol and about 10 to about 50 mole percent 1,3-cyclohexanedimethanol. Additional examples of diacid and diol components include, but are not limited to, (i) a diacid component comprising 100 mole percent terephthalic acid, and a diol component comprising about 10 to about 40 mole percent 1,4-cyclohexanedimethanol and 60 to about 90 mole percent ethylene glycol; (ii) a diol component comprising about 10 to about 99 mole percent of of 1,4-cyclohexanedimethanol, 0 to about 90 mole percent of ethylene glycol, and about 1 to about 25 mole percent of diethylene glycol; (iii) a diol component comprising about 50 to about 90 mole percent 1,4-cyclohexanedimethanol and about 10 to about 50 mole percent ethylene glycol; (iv) a diacid component comprising about 90 to 100 mole percent 1,4-cyclohexane-dicarboxylic acid and a diol component comprising about 90 to 100 mole percent 1,4-cyclohexanedimethanol; and (v) a diacid component comprising about 65 mole percent terephthalic acid and about 35 mole percent isophthalic acid.

The process of the invention may be carried out by continuous, semi-continuous, and batch modes of operation and may utilize a reaction zone comprising a variety of reactor types. Examples of suitable reactor types include, but are not limited to, stirred tank, continuous stirred tank, slurry, tubular, wiped-film, falling film, or extrusion reactors. The reaction zone, for example, may comprise 2 or more reactors which, typically, are arranged in a series configuration. The term "continuous" as used herein means a process wherein reactants are introduced and products withdrawn simultaneously in an uninterrupted manner. By "continuous" it is meant that the process is substantially or completely continuous in operation and is to be contrasted with a "batch" process. "Continuous" is not meant in any way to prohibit normal interruptions in the continuity of the process due to, for example, start-up, reactor maintenance, or scheduled shut down periods. The term "batch" process as used herein means a process wherein all or a portion of the reactants are added to the reactor and then processed according to a predetermined course of reaction during which additional reactants may be fed to but no polymer is removed from the reactor. The term "semicontinuous" means a process where some of the reactants are charged at the beginning of the process and the remaining reactants are fed continuously as the reaction progresses. Alternatively, a semicontinuous process may also include a process similar to a batch process in which all or a portion of the reactants are added at the beginning of the process except that one or more of the products are removed continuously as the reaction progresses. Typically, on a commercial scale, the process is operated advantageously as a continuous process for economic reasons and to reduce color formation and thermal degradation of the polymer as the polyester may deteriorate in appearance if allowed to reside in a reactor at an elevated temperature for too long a duration.

The diacid and diol components are added to the reaction zone such that the molar ratio of diol:diacid components is initially greater than the total diol:diacid component molar ratio. The total diol:diacid component molar ratio, which is the total moles of diol component added to the reaction zone divided by the total moles of acid component added to the reaction zone, typically is about 0.97 to about 1.2. Other, non-limiting examples of total diol:diacid component molar ratio ranges are about 1.0 to about 1.15, about 1.0 to about 1.10; about 1.0 to about 1.05, and about 1.0 to about 1.03. Specific examples of total diol:diacid component molar ratios which may be used in the process of the invention are 0.97, 0.98, 1.0, 1.03, 1.05, 1.07, 1.1, 1.12, and 1.15. Persons of skill in the art will understand, however, that the total molar ratio of diol component to diacid component is generally determined by the design of the reactor in which the process occurs and the nature of the diacid and diol components. The remaining diacid component then can be added incrementally to the reaction zone to bring the molar ratio of diol and diacid added to the reaction zone down to the total ratio. The term "incrementally", as used herein, is intended to have its plain meaning of adding the diacid component or diol component to the reaction zone in one or more increments or portions to increase the amount of the diol or diacid component in the reaction zone. The increments do not have to be equal in size. For example, one increment may contain 90% of the total amount of diacid component and a second increment may contain the remaining 10%. The increments may be added stepwise in discrete portions, continuously, or in a combination thereof. Therefore, the term "incrementally", as used in the description and claims, is intended to include both continuous and stepwise additions of the diol and/or diacid components. Thus, "incrementally" means that, over the duration of the entire process, the diol or diacid components can be added to the reaction zone continuously, stepwise in 2 or more stages or discrete steps, or in a combination of continuous and stepwise addition. Thus, in one embodiment of the invention, the diacid component is added to the reaction zone in 2 or more stages. In another embodiment, the diacid component is added to the reaction zone continuously. For example, for a polyester prepared from the reaction of a diol component and a diacid component at a total diol:diacid molar ratio of 1.1, the diol component and a first increment or portion of the diacid component may be added to the reaction zone, typically at a temperature of about 200 to about 250° C., to give intial diol:diacid molar ratio of 1.2 or greater. A second increment containing the remaining the diacid component then can be added either continuously or in one or more discrete steps, also at a temperature of about 200 to about 250° C., such that at the end of the addition the diol:diacid molar ratio is 1.1. In another example, in a batch reaction involving terephthalic acid (TPA), isophthalic acid (IPA), and 1,4-cyclohexanedimethanol (CHDM) at a total diol:diacid molar ratio of 1.03, initially only IPA and a portion of the CHDM is charged to the reactor at a CHDM:IPA molar ratio of 1.5. The IPA and CHDM, which may be fed to the reactor in one increment, more than one increment, or continuously, are reacted for a period of time whereupon the remaining TPA and CHDM is fed to the reactor in a second increment such that at the end of the addition, the molar ratio of the total amount of diol and diacid component added to the reactor is 1.03. The remaining TPA and CHDM may be fed to the reactor in one or more increments, continuously, or in a combination thereof. In another embodiment, the process may be carried out in a series of batch or continuous reactors, wherein a portion of one or more of TPA, IPA, and CHDM may be added to the first reactor and the remaining portion added to a subsequent reactor downstream in the process. The diacid and diol components may be added separately or as a slurry mixture, provided that the slurry components have no deleterious effect upon the process or can be removed easily. For example, the diacid component may be added as a mixture in water; an alcohol such as methanol, propanol, butanol, and isopropanol; a hydrocarbon such as toluene and xylene; or in one or more diols.

Typically, the polyester process of the invention will comprise 2 stages: an esterification stage and a polymerization stage, which are carried out at different temperatures and pressures. In the esterification stage, the diol and diacid components are esterified to form a low molecular weight polyester or oligomer and water as a byproduct. The majority of the water by-product is removed from the reaction zone during the esterifcation stage. The term "oligomer", as used herein, is understood to mean a low molecular weight polyester having an IV of 0.4 dL/g or less. In the process of the invention, the addition of diol and diacid components typically is completed during the esterification stage. Esterification generally occurs rapidly as the diol and diacid components are added to the reaction zone. Generally, the water by-product is removed from the reaction zone continuously by distillation as the reaction occurs. The esterification conditions may vary with the number and type of diacid and diol components added and the stage of reaction at which each component is added. For example, for copolyesters prepared from TPA, IPA, and CHDM, the esterification can be conducted at temperatures between 190° C. and 280° C. at a absolute pressure of about 48 kPa to about 552 kPa. The diacid component typically is added during the esterification step of the process. The preferred temperature range in this case is from about 210° C. to about 250° C. Unexpectedly, it has been found that maintaining the reaction zone during the esterification phase of the process at a temperature of 250° C. or less can produce an oligomer which exhibits higher polymerization rates, as measured by the rate of increase in IV in the polymerization step of the process, than an oligomer produced at higher esterification temperatures. For example, the esterification stage can be carried out by heating the diol and diacid components at temperature of about 210 to about 250° C. at an absolute pressure of about 48 kPa to about 552 kPa after the addition of the diacid or diol component is completed while removing a water by-product. In another example, the diacid and diol components can be heated at a temperature of about 210° C. to about 240° C. In yet another example, the the diacid and diol components can be heated at a temperature of about 220 to about 240° C. As noted above, the reaction pressure during esterification step may be from about 48 kPa absolute (7 psia) to about 552 kPa absolute (80 psia). Actual pressures used will depend upon the esterification temperature used and the type and amount of diol and dicarboxylic acid. The time for the esterification step will depend upon temperature, pressure, the nature and amount of diol and diacid components added to the esterification stage and when each component is added. For example, the esterification times for the production of copolyesters from TPA, IPA, and CHDM can vary between 30 minutes and 180 minutes. Typically, the duration of the esterification step is from about 60 minutes to about 120 minutes.

The esterification step of our inventive process produces a low molecular weight polyester or oligomer that may be reacted further in a second, polymerization stage under vacuum at higher temperatures until a polymer having the desired degree of polymerization, as determined by inherent viscosity, is obtained. For the process of the invention, the polyester from the polymerization stage will have an IV of at least 0.5 dL/g. The conditions of polymerization stage may vary with the number and type of acid and diol components added and the diol-to-diacid mole ratio used. For example, the polymerization may be conducted at temperatures between 260° C. and 310° C. Additional temperature ranges for the polymerization step include from about 260° C. to about 290° C. and about 260° C. to about 280° C. The reaction pressure during polymerization may be from about 53 kPa absolute (400 mm Hg) to about 0.013 kPa absolute (0.1 mm Hg). Stirring or appropriate conditions may be used in both the esterification and polymerization steps to ensure adequate heat transfer and surface renewal of the reaction mixture. During the polymerization stage, additional water from continued esterification of the oligomer may be removed by distillation along with small amounts of diol.

The reactions of both steps may be catalyzed by appropriate catalysts such as, for example, various compounds of titanium, tin, antimony, germanium, and mixtures thereof. Examples of typical catalysts include, but are not limited to, alkoxy titanium compounds, alkali metal hydroxides and alcoholates, salts of organic carboxylic acids, alkyl tin compounds, metal oxides, and the like. Typically, the polymerization catalyst is present in the range of 1 to 500 ppm. Compounds of titanium are the preferred catalysts. Typically, the titanium catalyst is added to the reaction zone to give a titanium concentration based on the final polymer weight of about 5 to about 150 ppm. Preferably, the amount of titanium is about 10 to about 90 ppm Ti, and more preferably about 20 to about 80 ppm. Suitable titanium compounds include acetyltriisopropyltitanate, tetraisopropyltitanate, and tetraisobutyltitanate. When titanium is the catalyst and ethylene glycol is used as a comonomer with CHDM in the process, a phosphorus compound inhibitor may optionally be used.

Persons of ordinary skill in the art will understand that in the polymerization stage of a polyester process, two reaction mechanisms may operate to complete the polymerization process and increase the molecular weight of the oligomer: (1) polycondensation whereby excess diol added in the esterification process is removed and (2) esterification whereby free acid groups continue to react with free hydroxyl groups from the diol components releasing water as a byproduct. Depending on the number and type of groups available for reaction, one or both of these mechanisms may operate to the final molecular weight obtained and the rate of polymerization. Without being bound by theory, it is believed that the primary mechanism for polymerization in the process of the present invention is esterification. Because esterification is the primary polymer-forming reaction, the process of the invention can exhibt an increased polymerization rate and produce a high molecular weight polyester using low diol-to-diacid ratios and lower polymerization temperatures.

Because our polyester process can exhibit increased reaction rates, it is often desirable that the residence time of the reaction zone at elevated temperatures is minimized to reduce the amount of thermal degradation and color formation by the polyester product. Thermal degradation of a polyester is frequency characterized by a loss of molecular weight (as determined by IV) and the development of color. In one embodiment, for example, the reaction zone may have a residence time of 5 hours or less at a temperature of 260° C. or greater. Further examples of residence times for the reaction zone of the invention at a temperature of 260° C. or greater are 4 hours or less, 3 hours or less, and 2 hours or less.

The polyesters prepared by the process of this invention also may contain other conventional additives and ingredients which do not deleteriously affect their end use. For example, additives such as fillers, surface friction modifiers, light and heat stabilizers, extrusion aids, antistatic agents, colorants, dyes, pigments, fluorescent brighteners, antimicrobials, anticounterfeiting markers, hydrophobic and hydrophilic enhancers, viscosity modifiers, slip agents, tougheners, adhesion promoters, and the like may be used. Colorants, sometimes referred to as toners, may be added to impart a desired neutral hue and/or brightness to the polyester. When colored polyesters are desired, pigments or colorants may be included in the polyester reaction mixture during the reaction of the diol and the diacid components or they may be melt blended with the polyester after completion of the process. A preferred method of including colorants is to use a colorant having thermally stable organic colored compounds with reactive groups such that the colorant is copolymerized and incorporated into the polyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the polyester reaction process after the direct esterification reaction.

Small amounts, typically less than 2 mole %, of branching agents may be used if desired. Conventional branching agents include polyfunctional acids, anhydrides, alcohols and mixtures thereof. Examples of suitable branching agents include, but are not limited to, trimellitic anhydride, pyromellitic dianhydride, glycerol, trimethylolpropane and pentaerythritol. Small amounts of a branching agent are useful in increasing the melt strength and melt viscosity of the polymers.

The thermoplastic polyesters prepared by the process of the invention typically have an inherent viscosity, abbreviated herein as "IV", of at least 0.5 dL/g, preferably about 0.55 to 1.3 dL/g. For example, the thermoplastic polyesters may have an IV of at least 0.6 dL/g, at least 0.65 dL/g, or at least 0.7 dL/g, as measured in a 60/40 parts by weight solution of phenol/tetrachloroethane solvent at 25° C. and at a concentration of about 0.5 g of polyester in 100 mL of solvent. In another example the thermoplastic polyester has an IV about 0.7 to about 0.9 dL/g. The copolyesters of the present invention typically have less than 200 milliequivalents of carboxylic acid end groups per kilogram of polymer (meq/kg) in the final polymer, more preferably less than 150 meq/kg, and most preferably less than 100 meq/kg as measured by titrating 1–2 grams of copolyester in 35 ml of o-cresol with a potassium hydroxide/ethanol solution.

Another embodiment of present invention is a process for the preparation of a polyester, comprising: adding a diol component comprising about 10 to about 100 mole percent 1,4-cyclohexanedimethanol, based on the total moles of diol component, and a diacid component comprising about 60 to about 100 mole percent terephthalic acid, based on the total moles of diacid component, to a reaction zone and at a total diol:diacid component molar ratio of about 0.97 to about 1.15 to produce a substantially linear, thermoplastic polyester having an inherent viscosity of at least 0.60 dL/g, wherein the diacid component is added incrementally to the reaction zone at a reaction zone temperature of about 220 to about 250° C. and the molar ratio of diol:diacid component added to the reaction zone is greater than the total molar ratio until the addition of the diacid component is completed. The diol and diacid components and process conditions are as described hereinabove. For example, in one embodiment, the thermoplastic polyester may have an IV of at least 0.7. Other examples of the total diol:diacid component molar ratio include about 1.0 to about 1.10 and about 1.0 to about 1.05.

The thermoplastic polyester, for example, may comprise about 60 to 100 mole percent, based on the total moles of dicarboxylic acid residues, of the residues of terephthalic acid, about 0 to about 40 mole percent of the residues isophthalic acid, and may comprise about 100 mole percent, based on the total moles of diol residues, of the residues of 1,4-cyclohexanedimethanol. In another example, the thermoplastic polyester may comprise about 95 mole percent of the residues of terephthalic acid and about 5 mole percent of the residues of isophthalic acid. In yet another example, the thermoplastic polyester comprises 100 mole percent of the residues of terephthalic acid. The thermoplastic polyester may contain the residues of other diols in addition to CHDM. For example, the thermoplastic polyester may comprise 80 to 100 mole percent of the residues of terephthalic acid, about 50 to about 90 mole percent of the residues of 1,4-cyclohexanedimethanol, and about 10 to about 50 mole percent 1,3-cyclohexanedimethanol. Additional examples of thermoplastic polyester compositions include, but are not limited to, (i) diacid residues comprising about 100 mole percent of the residues of terephthalic acid and a diol residues comprising about 10 to about 40 mole percent of the residues of 1,4-cyclohexanedimethanol and about 60 to about 90 mole percent of the residues of ethylene glycol; (ii) diol residues comprising about 10 to about 99 mole percent of the residues of 1,4-cyclohexanedimethanol, 0 to about 90 mole percent of the residues of ethylene glycol, and about 1 to about 25 mole percent of the residues of diethylene glycol; (iii) diol residues comprising about 50 to about 90 mole percent of the residues of 1,4-cyclohexanedimethanol and about 10 to about 50 mole percent of the residues of ethylene glycol; and (iv) diacid residues comprising about 65 mole percent of the residues of terephthalic acid and about 35 mole percent of the residues of isophthalic acid.

If the diacid component contains isophthalic acid, we have found that a high molecular weight polyester also may be prepared without the incremental addition of the diacid component simply by heating a mixture the diacid component and diol component together in the reaction zone. Hence, another embodiment of the invention is a process for the preparation of a polyester consisting essentially of heating a mixture of a diol component comprising about 10 to about 100 mole percent 1,4-cyclohexanedimethanol, based on the total moles of diol component, and a diacid component comprising about 5 to about 40 mole percent isophthalic acid, based on the total moles of diacid component, the mixture having total diol:diacid component molar ratio of about 1.0 to about 1.15, at a temperature of about 220 to about 300° C. to produce a substantially linear, thermoplastic polyester having an inherent viscosity of at least 0.60 dL/g. Other diacid components as described hereinabove may be present in addition to IPA. For example, the diacid component can comprise about 60 to about 95 mole percent TPA in addition to IPA. The neat diol and diacid components may be mixed together in a diol:diacid molar ratio of about 1 to about 1.15 and heated in a reaction zone to form a high molecular weight polymer. No solvents or diluents such as methanol or water are necessary. It is advantageous to heat to the diol and diacid components in the presence of one or more catalysts well-known to persons of ordinary skill in the art and described hereinabove. The phrase "consisting essentially of" when used in the context of this embodiment of the invention is intended to encompass a process in which a mixture comprising a diacid component comprising about 5 to about 40 mole percent isophthalic acid is heated in the presence of a diol component comprising about 10 to about 100 mole percent CHDM and is understood to exclude any elements that would substantially alter the essential and novel properties of the process to which the phrase refers. For example, the process may include other additives such as, for example, catalysts, flame retardants, antioxidants, colorants, etc. which do not substantially alter the esterification and polymerization aspects of the process. By contrast, the addition of a solvent or diluent such as, for example, an alcohol, hydrocarbon, or water (in excess of that produced as a byproduct of the esterification reaction) would be expected to alter the essential properties of the process and would be excluded from the invention.

As an alternative, our process also may be carried out by adding the diol component incrementally to the reaction zone. Thus, in another embodiment, the present invention provides a process for the preparation of a polyester, comprising: adding a diol component and a diacid component to a reaction zone at a total diol:diacid component molar ratio of about 0.97 to about 1.15 to produce a substantially linear, thermoplastic polyester having an inherent viscosity of at least 0.5 dL/g, wherein the diol component is added incrementally to the reaction zone at a temperature of about 210 to about 250° C. and the molar ratio of diol:diacid components added to the reaction zone is less than the total molar ratio until the addition of the diol component is completed. The various embodiments of the diol and diacid components, process conditions, catalysts, mole ratios, and the like, are as described hereinabove. This embodiment, however, differs from aspects of the invention described above in that the diacid and diol components are added to the reaction zone such that the molar ratio of diol:diacid components is initially less than the total diol:diacid component molar ratio. The total diol:diacid component molar ratio, typically is about 0.97 to about 1.15. Other, non-limiting examples of total diol:diacid component molar ratio ranges are about 1.0 to about 1.10, about 1.0 to about 1.05, and about 1. Specific examples of total diol:diacid component molar ratios which may be used in the process of the invention are 0.97, 0.98, 1.0, 1.03, 1.05, 1.07, 1.1, 1.12, and 1.15. The total molar ratio of diol component to diacid component, however, is generally determined by the design of the reactor in which the process occurs and the nature of the diacid and diol components. The diol component then can be added incrementally to the reaction zone to bring the molar ratio of diol and diacid components added to the reaction zone up to the total molar ratio.

The instant invention also provides a process for the preparation of a polyester, comprising:

(i) contacting a portion of a diacid component with a diol component comprising a diol having a boiling point of at least 230° C. at 101 kPa, under esterification conditions and at a diol:diacid component molar ratio greater than 1.2, while recovering a distillate comprising substantially water, to form an oligomer, (ii) adding at least one additional portion of the diacid component to the oligomer to give a total diol:diacid component molar ratio of 1.2 or less, and (iii) heating the oligomer under polymerization conditions for a period of 4 hours or less to produce a linear, thermoplastic polyester having an inherent viscosity of at least 0.65 dL/g.

The various embodiments of the diol and diacid components, process conditions, catalysts, mole ratios, and the like, are as described hereinabove. The process comprises contacting a portion of the diacd component with a diol component comprising at least one high boiling diol under esterification conditions of temperature and pressure such that the diol:diacid component molar ratio is greater than 1.2. During the esterification, a distillate comprising substantially water is recovered from the esterification reaction by distillation. By the term "substantially", it is meant that the amount of diol present in the total amount of distillate collected is 10 weight percent or less. The remaining portion of the diacid component is added to the reaction zone to give a total molar ratio of diol:diacid components of 1.2 or less. Preferably the total diol:diacid component molar ratio is from 0.97 to 1.2, more preferably from 1 to 1.10, and even more preferably 1.05. As describe previously, the diacid component may be added continuously or in 2 or more discrete steps.

During steps (i) and (ii) of the process, esterification of the diacarboxylic acid(s) with the diol(s) is the primary polyester-forming reaction, which releases water as a by-product. Typically, the esterification and addition of the dicarboxylic acid may be conducted at temperatures between 190° C. and 280° C. The preferred temperature range in this case is from about 210° C. to 250° C. As described previously, operating the esterification stage outside of this temperature range generally will produce an oligomer which exhibits lower rates of polymerization, as measured by the rate of increase in IV in the polymerization step of the process. Other representative temperature ranges for the esterification part of the reaction are about 210° C. to about 240° C. and about 220 to about 240° C.

The reaction pressure during the esterification stage may be from about 48 kPa absolute (7 psia) to about 552 kPa absolute (80 psia). Actual pressures used will depend upon the esterification temperature used and the diol type and amount. The time for esterification step will depend upon temperature, pressure, the nature and amount of diol and acid components added to the esterification stage and when each component is added. For example, the esterification times for the production of copolyesters from TPA, IPA, and CHDM can vary between 30 minutes and 180 minutes. Typically the duration of the esterification step is from about 60 minutes to about 120 minutes.

After the addition of the diacid component is completed, a low molecular weight polyester or oligomer is produced that may be reacted further in a second, polymerization stage under vacuum at higher temperatures until a polymer having the desired degree of polymerization, as determined by inherent viscosity, is obtained. The thermoplastic polyester from the polymerization stage typically will have an IV of at least 0.65 dL/g but a range of IV of from 0.5 dL/g to about 1.2 dL/g can be produced. Representative examples of IV's for the thermoplastic polyester are about 0.65 dL/g, about 0.70 dL/g, about 0.75 dL/g, and about 0.8 dL/g. The conditions of the polymerization stage may vary with the number and type of acid and diol components added and the diol-to-diacid mole ratio used but, typically, is conducted at temperatures between 260° C. and 310° C. Additional temperatures ranges for the polymerization step include from about 260° C. to about 290° C. and about 260° C. to about 280° C. The reaction pressure during polymerization may be from about 53 kPa absolute (400 mm Hg) to about 0.013 kPa absolute (0.1 mm Hg). Stirring or appropriate conditions may be used in both the esterification and polymerization steps to ensure adequate heat transfer and surface renewal of the reaction mixture. During the polymerization stage, additional water from continued esterification of the oligomer may be removed by distillation along with small amounts of diol. In yet another embodiment, our invention provides a process for the preparation of a polyester, comprising:

(i) contacting a portion of a diacid component comprising about 60 to 100 mole percent, based on the total moles of diacid component, of terephthalic acid with a diol component comprising about 10 to 100 mole percent, based on the total moles of diol component, of 1,4-cyclohexanedimethanol, under esterification conditions and at a diol:diacid component molar ratio greater than 1.2, while recovering a distillate comprising substantially water, to form an oligomer having a inherent viscosity of less than 0.4 dL/g, (ii) adding at least one additional portion of the diacid component to the oligomer to give a total diol:diacid component molar ratio of 1.2 or less; and (iii) heating the oligomer under polymerization conditions for a period of 4 hours or less to produce a linear, thermoplastic polyester having an inherent viscosity of at least 0.7 dL/g.

The various embodiments of the diol and diacid components, process conditions, catalysts, mole ratios, and the like, are as described hereinabove. The process comprises contacting a portion of the diacd component comprising about 60 to 100 mole percent terephthalic acid with a diol component comprising about 10 to 100 mole percent CHDM under esterification conditions of temperature and pressure such that the diol:diacid component molar ratio is greater than 1.2. Preferably the total diol:diacid component molar ratio is from 0.97 to 1.2, more preferably from 1 to 1.10, and even more preferably 1.05. As describe previously, the diacid component may be added continuously or in 2 or more discrete steps.

Typically, the esterification is conducted at temperatures of about 190° C. and about 280° C. The addition of the diacid component is carried out during the esterification stage. The preferred temperature range in for esterification is from about 210° C. to 250° C. Other representative temperature ranges for the esterification part of the reaction are about 210° C. to about 240° C. and about 220 to about 240° C. The reaction pressure during the esterification stage may be from about 48 kPa absolute (7 psia) to about 552 kPa absolute (80 psia). Actual pressures used will depend upon the esterification temperature used and the diol type and amount.

After the addition of the diacid component is completed, a low molecular weight polyester or oligomer having an IV of less than 0.4 dL/g is produced that may be reacted further in a second, polymerization stage under vacuum at higher temperatures until a polymer having the desired degree of polymerization, as determined by inherent viscosity, is obtained. The thermoplastic polyester from the polymerization stage typically will have an IV of at least 0.70 dL/g but ranges of 0.5 to about 1.2 dL/g can be produced. Representative examples of IV's for the thermoplastic polyester are about 0.70 dL/g, about 0.75 dL/g, and about 0.8 dL/g. The conditions of the polymerization stage may vary with the number and type of acid and diol components added and the diol-to-diacid mole ratio used but, typically, is conducted at temperatures between 260° C. and 310° C. Additional temperatures ranges for the polymerization step include from about 260° C. to about 290° C. and about 260° C. to about 280° C. The reaction pressure during polymerization may be from about 53 kPa absolute (400 mm Hg) to about 0.013 kPa absolute (0.1 mm Hg).

EXAMPLES

The invention is further illustrated by the following examples. The catalyst concentration in the final copolyesters of the present invention was determined by x-ray fluorescence. Inherent viscosities (IV) were measured in a 60/40 parts by weight solution of phenol/tetrachloroethane solvent at 25° C. and at a concentration of about 0.5 g of polyester in 100 mL of solvent.

Example 1

Production of poly(1,4-cyclohexylenedimethylene isophthalate) oligomer (PCI-oligomer): A slurry consisting of approximately 34.2% by weight isophthalic acid (IPA), 59.3% by weight 1,4-cyclohexanedimethanol (CHDM), and 6.6% by weight water was fed continuously to a 2.2 liter stirred reactor at a rate of about 42.2 grams per minute. The reactor was maintained at a temperature of 240° C. and atmospheric pressure with an agitator speed of 450 rpm. The PCI-oligomer product was continuously fed to a catch pot and then to a sample pan where the PCI-oligomer was allowed to cool to room temperature. The PCI-oligomer was characterized by proton NMR analysis to have the following properties: 1.973 moles CHDM component to 1 mole IPA component, 0.336 moles IPA per mole of PCI-oligomer segments with an average segment molecular weight in the PCI-oligomer of 141.13 grams/mole.

Examples 2–10

A copolyester of terephthalic acid was produced by charging 35.0 grams of terephthalic acid (TPA), 50.0 grams of the PCI-oligomer produced in Example 1, 18.0 grams of 1,4-cyclo-hexanedimethanol, and approximately 50–70 parts per million (ppm) titanium catalyst (as acetyltriisopropyltitanate) based on final polymer weight to a 0.5 liter reaction vessel at room temperature. Total diol-to-diacid feed mole ratio in this case was 1.091:1. The reactor vessel was equipped with a mechanical agitator, a side arm for condensate removal, a nitrogen inlet port, and a heat source (generally an oil or metal bath). The reaction vessel was then immersed in the heat source and brought rapidly up to the starting temperature indicated in Table 1. Esterification and polymerization were carried out using the reaction profile shown in Table 1. For Example 2, the resulting polymer had an IV of 0.778 dl/g, an acid content of 38 meq/kg, and a titanium content of 48 ppm.

TABLE 1

| Stage | Time (min) | Start Temp. (° C.) | End Temp (° C.) | Start Press. (kPa) | End Press. (kPa) | Stir Speed Start (RPM) | Stir Speed End (RPM) |
|---|---|---|---|---|---|---|---|
| 1 | 0.1 | 230 | 230 | 101 | 101 | 0 | 0 |
| 2 | 1 | 230 | 230 | 101 | 101 | 0 | 150 |
| 3 | 30 | 230 | 230 | 101 | 101 | 150 | 150 |
| 4 | 5 | 230 | 240 | 101 | 53 | 150 | 150 |
| 5 | 10 | 240 | 250 | 53 | 13 | 150 | 150 |
| 6 | 10 | 250 | 260 | 13 | 0.07 | 150 | 100 |
| 7 | 30 | 260 | 270 | 0.07 | 0.07 | 100 | 100 |
| 8 | 180 | 270 | 270 | 0.07 | 0.07 | 100 | 100 |
| 9 | 1 | 270 | 270 | 0.07 | 13 | 100 | 0 |

Several additional reactions were performed in a similar manner as described in Example 2 but the reaction was terminated at shorter polymerization times of 0, 40, 60, 74, and 140 minutes after the end of stage 5 listed in Table 1. Replicates of reactions terminated at 140 and 220 minutes were also performed. In this example the end of stage 5 is defined as the beginning of the polymerization phase of the reaction process. The results of these reactions are summarized in the Table 2. As shown by the data in Table 2, a copolyester with an IV greater than 0.5 dL/g was obtained for all polymerization times above 40 minutes and greater than 0.7 dL/g for 10 polymerization times above 60 minutes.

TABLE 2

| Example | TPA Added (g) | PCI Oligomer Added (g) | CHDM Added (g) | Polym. time (minutes) | IV (dL/g) | Acid Content (meq/kg) | Diol to diacid mole ratio | Ti by XRF (ppm) |
|---|---|---|---|---|---|---|---|---|
| 3 | 35.64 | 50.58 | 18.20 | 0 | 0.086 | 408 | 1.086 | 64 |
| 4 | 35.65 | 50.56 | 18.21 | 40 | 0.573 | 117 | 1.086 | 58 |
| 5 | 35.50 | 50.00 | 18.06 | 60 | 0.761 | 81 | 1.092 | 58 |

TABLE 2-continued

| Example | TPA Added (g) | PCI Oligomer Added (g) | CHDM Added (g) | Polym. time (minutes) | IV (dL/g) | Acid Content (meq/kg) | Diol to diacid mole ratio | Ti by XRF (ppm) |
|---|---|---|---|---|---|---|---|---|
| 6 | 35.02 | 50.02 | 18.10 | 74 | 0.817 | 42 | 1.093 | 69 |
| 7 | 35.27 | 50.00 | 18.03 | 140 | 0.759 | 50 | 1.086 | 66 |
| 8 | 35.62 | 50.02 | 18.02 | 140 | 0.744 | 71 | 1.079 | 62 |
| 9 | 35.00 | 50.00 | 18.20 | 220 | 0.767 | 58 | 1.095 | 67 |
| 10 | 35.00 | 50.00 | 18.00 | 220 | 0.778 | 38 | 1.091 | 48 |

Examples 11–16

A copolyester of terephthalic acid was produced in a similar manner as described in Example 2, but using higher temperatures in both the esterification and polymerization steps. In this example, 35.05 grams of terephthalic acid, 50.0 grams of the PCI-oligomer produced in Example 1, 18.02 grams of 1,4-cyclohexanedimethanol, and approximately 50–70 parts per million titanium catalyst (acetyltriisopropyltitanate) based on final polymer weight were charged to a 0.5 liter reaction vessel at room temperature. The TPA and CHDM were charged to the reactor together as a molten slurry. Total diol-to-diacid feed mole ratio in this case was 1.090:1.000. Esterification and polymerization were carried out using the reaction profile shown in Table 3. For Example 11, the resulting polymer had an IV of 0.640 dl/g, an acid content of 28 meq/kg, and a titanium content of 66 ppm.

TABLE 3

| Stage | Time (min) | Start Temp. (° C.) | End Temp (° C.) | Start Press. (kPa) | End Press. (kPa) | Stir Speed Start (RPM) | Stir Speed End (RPM) |
|---|---|---|---|---|---|---|---|
| 1 | 0.1 | 255 | 255 | 101 | 101 | 0 | 0 |
| 2 | 1 | 255 | 255 | 101 | 101 | 0 | 150 |
| 3 | 37 | 255 | 255 | 101 | 101 | 150 | 150 |
| 4 | 12 | 255 | 270 | 101 | 101 | 150 | 150 |
| 5 | 8 | 270 | 285 | 101 | 101 | 150 | 150 |
| 6 | 5 | 285 | 285 | 101 | 0.07 | 150 | 100 |
| 7 | 15 | 285 | 285 | 0.07 | 0.07 | 100 | 100 |
| 8 | 180 | 285 | 285 | 0.07 | 0.07 | 100 | 100 |
| 9 | 1 | 285 | 285 | 0.07 | 13 | 100 | 0 |

Additional reactions were performed in a similar manner as described above but the reaction was terminated at shorter polymerization times of 0, 30, 70, and 140 minutes after the end of stage 5 listed in Table 3. In this example the end of stage 5 is defined as the beginning of the polymerization phase of the reaction process. The results of these reactions are summarized in the Table 4. As shown by the data in Table 4, a copolyester with an IV greater than 0.5 dL/g was obtained for all polymerization times above 70 minutes, but no reaction yielded a copolyester with an IV of 0.7 dL/g or greater.

TABLE 4

| Example | TPA Added (g) | PCI Oligomer Added (g) | CHDM Added (g) | Polym. time (minutes) | IV (dL/g) | Acid Content (meq/kg) | Diol to diacid mole ratio | Ti (ppm) |
|---|---|---|---|---|---|---|---|---|
| 12 | 35.03 | 50.06 | 18.89 | 0 | 0.147 | 278 | 1.109 | 68 |
| 13 | 35.28 | 50.18 | 18.85 | 30 | 0.343 | 68 | 1.104 | 64 |
| 14 | 35.03 | 50.00 | 18.84 | 70 | 0.538 | 14 | 1.108 | 68 |
| 15 | 35.36 | 50.04 | 18.81 | 140 | 0.655 | 11 | 1.101 | 64 |
| 16 | 35.05 | 50.00 | 18.02 | 200 | 0.640 | 28 | 1.090 | 66 |

Table 5 shows the time evolution profiles for IV and acid content for Examples 2 and 11. It is clear that the process of Example 2 was more successful than the process of Example 11 at producing a high IV copolyester, even though the starting IV for polymerization is higher for the Example 11 process. Without being bound by theory, these results can be attributed to differences in acid end groups available for reaction between the two processes. In Example 11, the acid end groups are quickly depleted at low IV. In this case, further polymerization is no longer driven by esterification due to a lack of acid ends and therefore must be driven by polycondensation of the diol ends. By contrast, in the Example 2 process, there is a sufficient concentration of acid end groups throughout the polymerization process such that esterification is the primary reaction driving polymerization and the reaction proceeds more rapidly. The behavior is also evident in Table 5, which shows IV as a function of acid content for Examples 2 and 11.

TABLE 5

| Example | Time under vacuum (min) | Acid number (meq/kg) | IV (dL/g) |
|---|---|---|---|
| Example 2 | 0 | 408 | 0.086 |
| Example 2 | 40 | 117 | 0.573 |
| Example 2 | 60 | 81 | 0.761 |
| Example 2 | 74 | 42 | 0.817 |
| Example 2 | 140 | 50 | 0.759 |
| Example 2 | 140 | 71 | 0.744 |
| Example 2 | 220 | 58 | 0.767 |
| Example 2 | 220 | 38 | 0.778 |

TABLE 5-continued

| Example | Time under vacuum (min) | Acid number (meq/kg) | IV (dL/g) |
|---|---|---|---|
| Example 11 | 0 | 278 | 0.147 |
| Example 11 | 30 | 68 | 0.343 |
| Example 11 | 70 | 14 | 0.538 |
| Example 11 | 140 | 11 | 0.655 |
| Example 11 | 200 | 28 | 0.640 |

Example 17

A copolyester of terephthalic acid was produced in a similar manner as described in Example 2, but using a different temperature profile and a tin catalyst (a hydrated monobutyltin oxide available as Fastcat® 4100). In this example, 35.10 grams of terephthalic acid, 50.07 grams of the PCI-oligomer produced in Example 1, 18.04 grams of 1,4-cyclohexanedimethanol, and 354 parts per million tin catalyst based on final polymer weight were charged to a 0.5 liter reaction vessel at room temperature. The TPA and CHDM were charged to the reactor together as a slurry. As in Example 2, the reactor was immersed in the heat source and the temperature brought rapidly up to the starting value indicated in 6. Total diol-to-diacid mole ratio in this case was 1.090:1.000. Esterification and polymerization were carried out using the reaction profile shown in Table 6. The resulting polymer had an IV of 0.776 dl/g and an acid content of 92 meq/kg after approximately 110 minutes under a vacuum of 0.5 torr.

TABLE 6

| Stage | Time (min) | Start Temp. (° C.) | End Temp (° C.) | Start Press. (kPa) | End Press. (kPa) | Stir Speed Start (RPM) | Stir Speed End (RPM) |
|---|---|---|---|---|---|---|---|
| 1 | 0.1 | 220 | 220 | 101 | 101 | 0 | 0 |
| 2 | 1 | 220 | 220 | 101 | 101 | 0 | 150 |
| 3 | 30 | 220 | 220 | 101 | 101 | 150 | 150 |
| 4 | 5 | 220 | 230 | 101 | 53 | 150 | 150 |
| 5 | 10 | 230 | 245 | 53 | 13 | 150 | 150 |
| 6 | 10 | 245 | 260 | 13 | 0.07 | 150 | 100 |
| 7 | 30 | 260 | 270 | 0.07 | 0.07 | 100 | 100 |
| 8 | 27 | 270 | 270 | 0.07 | 0.07 | 100 | 100 |
| 9 | 0.1 | 270 | 280 | 0.07 | 0.07 | 100 | 100 |
| 10 | 53 | 280 | 280 | 0.07 | 0.07 | 100 | 100 |
| 11 | 1 | 280 | 280 | 0.07 | 13 | 100 | 0 |

Examples 18–23

Several additional reactions were performed in a similar manner as described in Example 2 to explore the effect of changing several process variables on the ability to produce a high IV polymer. These results are summarized in Table 7. Examples 18 and 19 demonstrate the use of lower diol-to-diacid mole ratios and different isophthalic acid compositions. Example 20 demonstrates the use of a lower titanium catalyst level and a higher polymerization temperature of 285° C. Examples 21–23 demonstrate the use of slightly higher diol-to-diacid mole ratios. As shown in Table 7, all runs in this example were capable of producing a copolyester with an IV of at least 0.7 dl/g with a final acid content of 108 meq/kg or less.

TABLE 7

| Ex. | TPA Added (g) | PCI Oligomer Added (g) | CHDM Added (g) | Polymerization time (minutes) | IV (dL/g) | Acid Content (meg/kg) | Diol to diacid mole ratio | Ti by XRF (ppm) |
|---|---|---|---|---|---|---|---|---|
| 18 | 52.68 | 27.24 | 39.38 | 210 | 0.701 | 108 | 1.050 | 70 |
| 19 | 46.96 | 41.66 | 29.60 | 65 | 0.765 | 101 | 1.050 | 62 |
| 20 | 35.11 | 50.01 | 18.04 | 95 | 0.768 | 68 | 1.090 | 38 |
| 21 | 37.06 | 50.08 | 20.31 | 130 | 0.772 | 51 | 1.115 | 85 |
| 22 | 36.03 | 50.00 | 20.89 | 130 | 0.747 | 47 | 1.130 | 54 |
| 23 | 36.09 | 50.00 | 20.22 | 130 | 0.875 | 21 | 1.115 | 72 |

Examples 24–29

Several additional reactions were performed in a similar manner as described in Example 11 but with a diol-to-diacid ratio from 1.005:1 to 1.060:1. These results are summarized in Table 8. The data in Table 8 show that a copolyester with an IV of at least 0.7 dl/g and a final acid content of less than 100 meq/kg can be produced using the reaction profile in Example 11 by using a diol-to-diacid mole ratio near 1.0:1.

TABLE 8

| Example | TPA Added (g) | PCI Oligomer Added (g) | CHDM Added (g) | Polym. time (minutes) | IV (dL/g) | Acid Content (meq/kg) | Diol to diacid mole ratio | Ti by XRF (ppm) |
|---|---|---|---|---|---|---|---|---|
| 24 | 41.28 | 56.11 | 20.38 | 120 | 0.659 | 39 | 1.060 | 59 |
| 25 | 41.28 | 56.09 | 19.81 | 120 | 0.660 | 13 | 1.049 | 60 |
| 26 | 41.27 | 56.16 | 19.30 | 120 | 0.652 | 16 | 1.041 | 60 |
| 27 | 41.30 | 56.09 | 18.17 | 120 | 0.688 | 14 | 1.019 | 72 |
| 28 | 41.25 | 56.08 | 17.62 | 120 | 0.700 | 17 | 1.010 | 59 |
| 29 | 41.25 | 56.08 | 17.34 | 120 | 0.702 | 20 | 1.005 | 67 |

Example 30

A copolyester of terephthalic acid was produced by first reacting IPA and CHDM in the presence of a titanium catalyst followed by the addition of TPA to the reaction mixture. Initially, 24.21 grams of the IPA, 63.55 grams of CHDM, and approximately 50 to 70 parts per million titanium catalyst (acetyltriisopropyltitanate) based on final polymer weight were charged to a 0.5 liter reaction vessel at room temperature. The reactor vessel was equipped with a mechanical agitator, a side arm for condensate removal, a feed port, a nitrogen inlet port, and a heat source. The reaction vessel was immersed in the heat source and rapidly brought up to the starting temperature indicated in Table 9. Esterification and polymerization were carried out using the reaction profile shown in Table 9. After the reaction had proceeded 30 minutes into stage 3, 45.52 grams of TPA was added to the reaction mixture over approximately 5 minutes. Total diol-to-diacid feed mole ratio in this case was 1.05:1. The resulting polymer had an IV of 0.710 dl/g, an acid content of 96 meq/kg, and a titanium content of 50 ppm.

TABLE 9

| Stage | Time (min) | Start Temp. (° C.) | End Temp (° C.) | Start Press. (kPa) | End Press. (kPa) | Stir Speed Start (RPM) | Stir Speed End (RPM) |
|---|---|---|---|---|---|---|---|
| 1 | 0.1 | 220 | 220 | 101 | 101 | 0 | 0 |
| 2 | 1 | 220 | 220 | 101 | 101 | 0 | 150 |
| 3 | 60 | 220 | 220 | 101 | 101 | 150 | 150 |
| 4 | 5 | 220 | 230 | 101 | 101 | 150 | 150 |
| 5 | 60 | 230 | 230 | 101 | 101 | 150 | 150 |
| 6 | 5 | 230 | 240 | 101 | 53 | 150 | 150 |
| 7 | 10 | 240 | 250 | 53 | 13 | 150 | 150 |
| 8 | 10 | 250 | 260 | 13 | 10 | 150 | 100 |
| 9 | 30 | 260 | 270 | 10 | 0.07 | 100 | 100 |
| 10 | 95 | 270 | 270 | 0.07 | 0.07 | 100 | 100 |
| 11 | 1 | 270 | 270 | 0.07 | 13 | 100 | 0 |

Example 31

A copolyester of terephthalic acid was produced by charging 45.52 grams of terephthalic acid, 24.21 grams of the isophthalic acid, 60.5 grams of 1,4-cyclohexanedimethanol, and approximately 50–70 parts per million titanium catalyst (acetyltriisopropyltitanate) based on final polymer weight to a 0.5 liter reaction vessel. Total diol-to-diacid mole ratio in this case was 1.0:1. The reactor vessel was equipped with a mechanical agitator, a side arm for condensate removal, a nitrogen inlet port, and a heat source. Esterification and polymerization were carried out using the same reaction profile used in Example 2 (Table 1) except the reaction time in stage 8 was reduced to 50 minutes. The resulting polymer had an IV of 0.715 dL/g, an acid content of 143 meq/kg, and a titanium content of 59 ppm. A repeat of this run resulted in a polymer with an IV of 0.678 dL/g, an acid content of 121 meq/kg, and a titanium content of 63 ppm.

Examples 32–35

Several reactions were performed in a similar manner as described in Example 31 using a range of diol-to-diacid ratios from 1.01:1 to 1.20:1. The reaction profile was the same as shown in Table 8 but with a starting temperature of 210° C. in stages 1–4. These results are summarized in Table 10. In these examples, the polymerization time is defined as the time of reaction following the end of stage 8 shown in Table 9. As shown in Table 10, all examples were capable of producing a copolyester with an IV of at least 0.5 dL/g with a final acid content of 100 meq/kg or less. However, from Examples 32 and 33, it is clear that using lower diol-to-diacid ratios in this case produces copolyesters with a higher IV in a shorter time than Examples 34 and 35 which use higher diol-to-diacid ratios.

TABLE 10

| Example | TPA Added (g) | IPA Added (g) | CHDM Added (g) | Polym. time (minutes) | IV (dL/g) | Acid Content (meq/kg) | Diol to diacid mole ratio | Ti by XRF (ppm) |
|---|---|---|---|---|---|---|---|---|
| 32 | 45.52 | 24.21 | 61.13 | 110 | 0.688 | 99 | 1.010 | 53 |
| 33 | 45.52 | 24.21 | 63.55 | 110 | 0.692 | 89 | 1.050 | 53 |
| 34 | 45.52 | 24.21 | 69.60 | 210 | 0.550 | 30 | 1.150 | 50 |
| 35 | 45.52 | 24.21 | 72.63 | 210 | 0.543 | 38 | 1.200 | 47 |

Example 36

A polyester of terephthalic acid was produced by adding TPA to CHDM in stages in the presence of a titanium catalyst. Initially, 57.85 grams of CHDM, and approximately 50 to 70 parts per million titanium catalyst (acetyltriisopropyltitanate in butanol) based on final polymer weight were charged to a 0.5 liter reaction vessel. The reactor vessel was equipped with a mechanical agitator, a side arm for condensate removal, a feed port, a nitrogen inlet port, and a heat source. Esterification and polymerization were carried out using the reaction profile shown in Table 11. Once the reactor came up to a reaction temperature of 260° C. in stage 2, 4 distinct charges of 7.93 grams of terephthalic acid were added to the mixture every 10 minutes through stage 3. A final charge of 31.73 grams of terephthalic acid was added 5 minutes after the start of stage 5. Total diol-to-diacid feed mole ratio in this case was 1.05:1. The resulting polymer had an IV of 0.807 dL/g, an acid content of 45 meq/kg, and a titanium content of 65 ppm.

TABLE 11

| Stage | Time (min) | Start Temp. (° C.) | End Temp (° C.) | Start Press. (kPa) | End Press. (kPa) | Stir Speed Start (RPM) | Stir Speed End (RPM) |
|---|---|---|---|---|---|---|---|
| 1 | 0.1 | 220 | 220 | 101 | 101 | 0 | 0 |
| 2 | 15 | 260 | 220 | 101 | 101 | 0 | 150 |
| 3 | 50 | 260 | 220 | 101 | 101 | 150 | 150 |
| 4 | 30 | 260 | 275 | 101 | 101 | 150 | 150 |
| 5 | 10 | 275 | 280 | 101 | 101 | 150 | 150 |
| 6 | 5 | 280 | 285 | 101 | 53 | 150 | 150 |
| 7 | 5 | 285 | 290 | 53 | 13 | 150 | 100 |
| 8 | 5 | 290 | 295 | 13 | 0.07 | 100 | 100 |
| 9 | 5 | 295 | 300 | 0.07 | 0.07 | 100 | 100 |
| 10 | 10 | 300 | 300 | 0.07 | 0.07 | 100 | 100 |

Example 37

A polyester of terephthalic acid was produced in a similar manner as in Example 36 but without staged addition of TPA. In this example, 63.46 grams of TPA, 57.85 grams of CHDM, and approximately 50 to 70 parts per million titanium catalyst (acetyltriisopropyltitanate) based on final polymer weight were charged to a 0.5 liter reaction vessel. The reactor vessel was equipped with a mechanical agitator, a side arm for condensate removal, a nitrogen inlet port, and a heat source. Esterification and polymerization were carried out using the reaction profile shown in Table 11 except stage 10 was extended to 180 minutes to allow additional time for polymerization. Total diol-to-diacid feed mole ratio in this case was 1.05:1. The resulting polymer had an IV of 0.437 dL/g, an acid content of 91 meq/kg, and a titanium content of 48 ppm.

We claim:

1. A process for the preparation of a polyester, comprising: adding a diol component comprising 1,4-cyclohexanedimethanol, and a diacid component to a reaction zone at a total diol:diacid component molar ratio of about 0.97 to about 1.2 to produce a substantially linear, thermoplastic polyester having an inherent viscosity of at least 0.5 dL/g, wherein the diacid component is added incrementally to the reaction zone and the diol:diacid component molar ratio in the reaction zone is greater than the total molar ratio until the addition of the diacid component is completed.

2. The process according to claim 1 further comprising heating the diol and diacid components at a temperature of about 210 to about 250° C. at an absolute pressure of about 48 kPa to about 552 kPa after the addition of the diacid component is completed.

3. The process according to claim 2 wherein the temperature is about 210 to about 240° C.

4. The process according to claim 3 wherein the temperature is about 220 to about 240° C.

5. The process according to claim 1 wherein the diacid component comprises at least 80 mole percent, based on the total moles of diacid component, of one or more dicarboxylic acids selected from the group consisting of terephthalic acid, naphthalenedicarboxylic acid, 1,4-cyclohexanedicarboxylic acid, and isophthalic acid; and the diol component comprises about 10 to 100 mole percent, based on the total moles of the diol component, 1,4-cyclohexanedimethanol and 0 to about 90 mole percent of one or more diols selected from the group consisting of neopentyl glycol, diethylene glycol, ethylene glycol, 1,2-propanediol, 1,3-propanediol, 1,4-butanediol, 1,5-pentanediol, 1,6-hexanediol, 1,8-octanediol, 2,2,4-trimethyl-1,3-pentanediol, 1,3-cyclohexanedimethanol, bisphenol A, and polyalkylene glycol.

6. The process according to claim 5 wherein the diacid component further comprises about 0 to 20 mole percent of one or more dicarboxylic acids selected from the group consisting of fumaric, succinic, adipic, glutaric, azelaic, sebacic, resorcinol diacetic, diglycolic, 4,4'-oxybis(benzoic), biphenyldicarboxylic, 4,4'-methylenedibenzoic, trans-4,4'-stilbenedicarboxylic, and sulfoisophthalic acids.

7. The process according to claim 6 wherein the diacid component comprises from about 60 to 100 mole percent terephthalic acid and 0 to about 40 mole percent isophthalic acid and the diol residue comprises about 100 mole percent 1,4-cyclohexane-dimethanol.

8. The process according to claim 7 wherein the diacid component comprises about 95 mole percent terephthalic acid and about 5 mole percent isophthalic acid.

9. The process according to claim 7 wherein the diacid component comprises 100 mole percent terephthalic acid.

10. The process according to claim 6 wherein the diacid component comprises 80 to 100 mole percent terephthalic acid and the diol component comprises about 50 to about 90 mole percent 1,4-cyclo-hexanedimethanol and about 10 to about 50 mole percent 1,3-cyclohexanedimethanol.

11. The process according to claim 6 wherein the diacid component comprises 100 mole percent terephthalic acid and the diol component comprises about 10 to about 40 mole percent 1,4-cyclohexanedimethanol and 60 to about 90 mole percent ethylene glycol.

12. The process according to claim 6 wherein the diol component comprises about 10 to about 99 mole percent of of 1,4-cyclohexanedimethanol, 0 to about 90 mole percent of ethylene glycol, and about 1 to about 25 mole percent of diethylene glycol.

13. The process according to claim 6 wherein the diol component comprises about 50 to about 90 mole percent 1,4-cyclohexanedimethanol and about 10 to about 50 mole percent ethylene glycol.

14. The process according to claim 6 wherein the diacid component comprises about 90 to 100 mole percent 1,4-cyclohexanedicarboxylic acid and the diol component comprises 90 to 100 mole percent 1,4-cyclohexanedimethanol.

15. The process according to claim 1 wherein the total diol:diacid component molar ratio is about 1.0 to about 1.10.

16. The process according to claim 15 wherein the total diol:diacid component molar ratio is about 1.0 to about 1.05.

17. The process according to claim 1 wherein the diacid component is added in at least 2 stages to the reaction zone.

18. The process according to claim 1 wherein the diacid component is added continuously to the reaction zone.

19. The process according to claim 6 wherein the diacid component is added as a mixture in water, an alcohol, or one or more diols.

20. The process according to claim 6 wherein the reaction zone comprises at least 2 reactors.

21. The process according to claim 18 wherein the inherent viscosity of the thermoplastic polyester is at least 0.65 dL/g.

22. The process according to claim 18 wherein the inherent viscosity of the thermoplastic polyester is at least 0.7 dL/g.

23. A process for the preparation of a polyester, comprising: adding a diol component comprising about 10 to about 100 mole percent 1,4-cyclohexanedimethanol, based on the total moles of diol component, and a diacid component comprising about 60 to about 100 mole percent terephthalic acid, based on the total moles of diacid component, to a reaction zone and at a total diol:diacid component molar ratio of about 1.0 to about 1.15 to produce a substantially linear, thermoplastic polyester having an inherent viscosity of at least 0.60 dL/g, wherein the diacid component is added incrementally to the reaction zone at a temperature of about 220 to about 250° C. and the molar ratio of diol:diacid component added to the reaction zone is greater than the total molar ratio until the addition of the diacid component is completed.

24. The process according to claim 23 wherein the reaction zone has a residence time of 5 hours or less at a temperature of 260° C. or greater.

25. The process according to claim 24 wherein the reaction zone has a residence time of 4 hours or less at a temperature of 260° C. or greater.

26. The process according to claim 25 wherein the reaction zone has a residence time of 3 hours or less at a temperature of 260° C. or greater.

27. The process according to claim 26 wherein the reaction zone has a residence time of 2 hours or less at a temperature of 260° C. or greater.

28. The process according to claim 25 wherein the total diol:diacid component molar ratio is about 1.0 to about 1.10.

29. The process according to claim 28 wherein the total diol:diacid component molar ratio is about 1.0 to about 1.05.

30. The process according to claim 23 wherein the polyester comprises about 60 to 100 mole percent, based on the total moles of dicarboxylic acid residues, of the residues of terephthalic acid, about 0 to about 40 mole percent of the residues isophthalic acid, and comprises about 100 mole percent, based on the total moles of diol residues, of the residues of 1,4-cyclohexanedimethanol.

31. The process according to claim 30 wherein the polyester comprises about 65 mole percent of the residues of terephthalic acid and about 35 mole percent of the residues of isophthalic acid.

32. The process according to claim 30 wherein the polyester comprises about 95 mole percent of the residues of terephthalic acid and about 5 mole percent of the residues of isophthalic acid.

33. The process according to claim 30 wherein the polyester comprises 100 mole percent of the residues terephthalic acid.

34. The process according to claim 23 wherein the polyester comprises 100 mole percent, based on the total moles of dicarboxylic acid residues, of the residues of terephthalic acid, and about 10 to about 40 mole percent, based on the total moles of diol residues, of the residues of 1,4-cyclohexanedimethanol and about 60 to about 90 mole percent of the residues of ethylene glycol.

35. The process according to claim 23 wherein the polyester comprises about 10 to about 99 mole percent, based on the total moles of diol residues, of the residues of 1,4-cyclohexanedimethanol, 0 to about 90 mole percent of the residues of ethylene glycol, and about 1 to about 25 mole percent of the residues of diethylene glycol.

36. The process according to claim 23 wherein the polyester comprises about 50 to about 90 mole percent, based on the total moles of diol residues, of the residues of 1,4-cyclohexanedimethanol and about 10 to about 50 mole percent of the residues of ethylene glycol.

* * * * *